(12) United States Patent  (10) Patent No.: US 8,197,687 B2
Krogue et al.  (45) Date of Patent: Jun. 12, 2012

(54) CONTAMINANT ADSORBENT FLUTED FILTER ELEMENT

(75) Inventors: John A. Krogue, Mineral Wells, TX (US); Daniel M. Cloud, Weatherford, TX (US)

(73) Assignee: Perry Equipment Corporation, Mineral Wells, TX (US)

( * ) Notice: Subject to any disclaimer, the term of this patent is extended or adjusted under 35 U.S.C. 154(b) by 211 days.

(21) Appl. No.: 12/539,734

(22) Filed: Aug. 12, 2009

(65) Prior Publication Data

US 2010/0044297 A1 Feb. 25, 2010

Related U.S. Application Data

(60) Provisional application No. 61/090,093, filed on Aug. 19, 2008.

(51) Int. Cl.
*B01D 27/02* (2006.01)
*B01D 27/06* (2006.01)

(52) U.S. Cl. ........ 210/282; 210/284; 210/291; 210/457; 210/492; 210/493.2; 210/493.4; 210/497.1; 210/502.1

(58) Field of Classification Search .......... 210/282–284, 210/288, 289, 291, 317, 484, 487, 492, 493.1, 210/493.2, 493.4, 493.5, 494.1, 497.1, 502.1, 210/457; 55/498, 512, 517
See application file for complete search history.

(56) References Cited

U.S. PATENT DOCUMENTS

| | | | | |
|---|---|---|---|---|
| 496,614 A * | 5/1893 | Lansingh | | 210/423 |
| 1,585,113 A | 5/1926 | Robert | | |
| 2,537,897 A * | 1/1951 | Hunter | | 210/494.1 |
| 2,727,597 A * | 12/1955 | Musgrave | | 52/775 |
| 2,796,989 A * | 6/1957 | Kovacs | | 210/282 |
| 3,397,793 A * | 8/1968 | Macdonnell | | 210/457 |
| 4,366,054 A | 12/1982 | Kronsbein | | |
| 4,589,983 A | 5/1986 | Wydevan | | |
| 4,699,681 A | 10/1987 | Kasmark, Jr. et al. | | |
| 4,759,847 A * | 7/1988 | Medbury | | 210/484 |
| 4,840,734 A * | 6/1989 | Johnson | | 210/660 |
| 4,902,427 A * | 2/1990 | Szczepanik | | 210/484 |
| 5,893,956 A | 4/1999 | Perry, Jr. et al. | | |
| 6,165,519 A | 12/2000 | Lehrer et al. | | |
| 6,235,195 B1 * | 5/2001 | Tokar | | 210/238 |
| 6,326,326 B1 * | 12/2001 | Feng et al. | | 502/62 |
| 6,379,437 B1 | 4/2002 | Heinonen et al. | | |
| 6,531,224 B1 | 3/2003 | Fryxell et al. | | |
| 6,733,835 B2 | 5/2004 | Fryxell et al. | | |
| 6,753,038 B2 | 6/2004 | Fryxell et al. | | |
| 6,783,119 B2 | 8/2004 | Zich et al. | | |
| 6,846,554 B2 | 1/2005 | Fryxell et al. | | |
| 6,874,769 B2 | 4/2005 | Lantz et al. | | |

(Continued)

OTHER PUBLICATIONS

U.S. Appl. No. 12/468,386, filed May 19, 2009, Krogue et al.

(Continued)

*Primary Examiner* — Matthew Savage

(74) *Attorney, Agent, or Firm* — Reinhart Boerner Van Deuren P.C.

(57) ABSTRACT

A contaminant adsorption filter element is provided that includes a self-assembled monolayers on mesoporous supports (SAMMS) contained in a filter element having a plurality of pockets such as a fluted filter media. The plurality of pockets are filled with mesoporous material that is functionalized for a target contaminant. A method of making a filter element having mesoporous material filled flutes is also provided.

20 Claims, 9 Drawing Sheets

U.S. PATENT DOCUMENTS

| | | |
|---|---|---|
| 7,255,300 B2 | 8/2007 | Johnston |
| 7,329,326 B2 | 2/2008 | Wagner et al. |
| 2005/0000363 A1 | 1/2005 | Minemura et al. |
| 2005/0252182 A1 | 11/2005 | Golden et al. |
| 2006/0091066 A1 | 5/2006 | Driml et al. |
| 2006/0091084 A1 | 5/2006 | Merritt et al. |
| 2006/0101999 A1 | 5/2006 | Steins |
| 2006/0151655 A1 | 7/2006 | Johnston |
| 2007/0095203 A1 | 5/2007 | Paris et al. |
| 2007/0169449 A1 | 7/2007 | Merritt |
| 2007/0186528 A1 | 8/2007 | Wydeven et al. |
| 2007/0254120 A1 | 11/2007 | Rasmussen |
| 2007/0256980 A1 | 11/2007 | Krogue et al. |
| 2007/0256981 A1 | 11/2007 | Krogue et al. |
| 2007/0262025 A1 | 11/2007 | Krogue et al. |
| 2007/0262027 A1 | 11/2007 | Krogue et al. |
| 2007/0295204 A1 | 12/2007 | Krogue et al. |
| 2008/0011683 A1 | 1/2008 | Dong et al. |
| 2008/0011896 A1 | 1/2008 | Johnston et al. |
| 2008/0128364 A1 | 6/2008 | Cloud et al. |
| 2009/0294348 A1* | 12/2009 | Krogue et al. ............... 210/266 |

OTHER PUBLICATIONS

I. Yuranov et al.; Structured Combustion Catalysts Based on Sintered Metal Fibre Filters; Institute of Chemical Engineering publication; Jul. 10, 2003; 12 pages, pp. 217-227; vol. 43 No. 3 ISSN: 0926-3373; Applied Catalysis B: Environmental; Elsevier Science B.V.

I. Yuranov et al.; Pd/SiO$_2$ Catalysts: Synthesis of Pd Nanoparticles with the Controlled Size in Mesoporous Silicas; Journal of Molecular Catalysis A: Chemical publication; Feb. 3, 2003; 14 pages, pp. 239-251; vol. 192 No. 1-2 ISSN: 1381-1169; Elsevier Science B.V.

C. Horny et al.; Micro-Structured String-Reactor for Autothermal Production of Hydrogen; Chemical Engineering Journal 101; 2004; 7 pages, pp. 3-9; Elsevier.

L. Kiwi-Minsker et al.; Microstructured Reactors for Catalytic Reactions; Institute of Chemical Engineering publication; Dec. 15, 2005; 20 pages, pp. 2-14; vol. 110 No. 1-2 ISSN: 0920-5861; Elsevier B.V.

I. Yuranov et al.; Metal Grids with High-Porous Surface as Structured Catalysts: Preparation, Characterization and Activity in Propane Total Oxidation; Institute of Chemical Engineering publication; Mar. 8, 2002; 9 pages, pp. 183-191; vol. 36 No. 3 ISSN: 0926-3373; Applied Catalysis B: Environmental; Elsevier Science B.V.

B. Louis et al.; Synthesis and Characterization of MCM-41 Coatings on Stainless Steel Grids; Catalysis Communications 3 publication; 2002; 5 pages, pp. 159-163; Elsevier Science B.V.

Koch-Glitsch; Gauze Structured Packing; Bulletin KGP-6; 2000; 8 pages, pp. 1-8; Koch-Glitsch, Inc.

Samms Adsorbents by Steward; http://sammsadsorbents.com Website, last visited Mar. 14, 2008; 27 pages.

Southwest Screens & Filters; http://southwest.e-start.be/eng/products-filtermedia.asp Website, last visited Apr. 2, 2008; 2 pages.

Koch-Glitsch; http://koch-glitsch.com Website, last visited Apr. 2, 2008; 6 pages.

Montz Dividing Wall Columns; http://www.montz.de Website, last visited Mar. 13, 2008; 8 pages.

Bekaert; Metal filter elements and systems; product pamphlet; 2006, 15 pages, pp. 1-15; Bekaert Advanced Filtration SA.

* cited by examiner

CONTAMINANT ADSORBENT FLUTED FILTER ELEMENT

CROSS-REFERENCE TO RELATED PATENT APPLICATIONS

This patent application claims the benefit of U.S. Provisional Patent Application No. 60/090,093, filed Aug. 19, 2008, the entire teachings and disclosure of which are incorporated herein by reference thereto.

FIELD OF THE INVENTION

This invention generally relates to filtration media, filter elements, filtration systems and methods for the treatment of contaminated fluids and more particularly to such apparatuses and methods for the removal of toxic heavy metals utilizing a contaminant adsorbent, an exemplary example being self-assembled monolayers on mesoporous supports (SAMMS), that is contained in a filter element, and/or to fluted filter elements.

BACKGROUND OF THE INVENTION

There are many situations where toxic heavy metals such as mercury are contained in fluid streams (both gaseous and liquid). For example, produced water from offshore oil platforms can have mercury levels that range from less than 100 parts per billion (ppb) in the gulf of Mexico to about 2,000 ppb in the Gulf of Thailand. Complicating matters is that in many applications, sediments and other undesirable particles may also be present in many environmental applications. Removal of such toxic heavy metals to acceptable levels, while the subject of a long felt desire and need, has been typically satisfied with either inadequate, difficult and/or expensive solutions.

The use of particles of self-assembled monolayers on mesoporous supports (SAMMS) have shown to have substantial capabilities for adsorbing toxic metal contaminants. An example SAMMS material is disclosed in U.S. Pat. Nos. 6,326,326; 6,531,224; 6,733,835; 6,753,038; and 6,846,554, the entire disclosures of which are hereby incorporated by reference. One type of SAMMS is thiol-SAMMS, in which the mesoporous material is functionalized with molecules of a thiol group. Thiol-SAMMS is commercially available as particles in a powder-like form from Steward Environmental Solutions, LLC of Chattanooga, Tenn. The SAMMS powder material typically can have different particle diameters that are typically in the range of between about 30 and about 200 microns (Steward Environmental Solutions, LLC advertises an average diameter of 40 microns). On the one hand, providing a larger diameter is beneficial from a fluid flow standpoint in that a fixed bed of powder material allows for greater fluid flow. However, larger adsorbent particles do not have as much effective available surface area for contaminant adsorption. While smaller SAMMS powder material provides for greater effective surface area and adsorption potential, packing such small powder is highly restrictive to fluid flow and can create difficulties from a fluid flow standpoint.

SAMMS has extremely fast kinetics and a sizeable loading capacity (e.g. 0.4-0.6 grams HG/gram of THIOL-Samms adsorbent for terminal HG concentration of 100-200 ppm). Additionally, SAMMS works through covalently bonding for reliable retention of toxic metal contaminant. SAMMS typically has a bulk density of between approximately 0.2 g/cc and 0.4 g/cc.

Various examples have been disclosed for using such SAMMS powder particles. For example, various SAMMS filtration systems are disclosed in U.S. Patent Publication Nos. US 2007/0295204 A1 entitled "Systems And Methods For Flow-Through Treatment Of Contaminated Fluid"; US 2007/0262027 A1 entitled "Layered Filter For Treatment Of Contaminated Fluids"; US 2007/0262025 A1 entitled "Canister For Treatment Of Contaminated Fluids"; US 2007/0256981 A1 entitled "Composite Adsorbent Block For The Treatment of Contaminated Fluids"; and US 2007/0256980 entitled "Countercurrent Systems And Methods For Treatment Of Contaminated Fluids". All of these patent publications are incorporated by reference in their entireties.

Filters of the type used for filtering particulate matter from fluid sometimes include one or more layers of a porous filter material that is formed into a convoluted pattern, often referred to in the industry as fluted filter media. Fluted filter media is commonly used in construction of filter elements. Fluted filter media is typically formed by winding a convoluted sheet and a face sheet about an axis to form a plurality of contiguous adjacent flutes. In one common form of such fluted filter media, alternating ends of adjacent flutes are blocked to cause fluid entering one open end of "inlet" flutes to flow through the porous filter media into adjacent "outlet" flutes prior to exiting the filter media at an opposite end of the flutes. As the fluid flow through the wall of porous material from the first flutes to the adjacent flutes, particulate matter in the fluid is filtered out of the fluid and trapped in the first flutes and the porous filter material of the wall. Prior such filter elements are disclosed in U.S. Pat. No. 7,329,326 (Wagner, et al.) and U.S. Patent Application Publication No. 2006/0091084 (Merrit et al.), herein incorporated by reference in their entireties.

The present invention pertains to improvements to the state of the art.

BRIEF SUMMARY OF THE INVENTION

In one aspect, the invention provides a filter element comprising a filter media having a plurality of pockets formed therein about a central axis, a pair of end caps affixed to opposing axial ends of the filter media, and contaminant adsorbent material trapped in the plurality of pockets.

In accordance with the aspect above, one embodiment uses fluted filter media to provide pockets. In such an embodiment, the contaminant adsorbent material may comprise self-assembled monolayers on mesoporous supports (SAMMS). The SAMMS material can be filled in a plurality flutes of the fluted filter media, wherein the SAMMS material is designed to remove heavy metals from a fluid.

In another aspect, the invention provides a fluted filter element comprising a fluted filter media having opposed axial ends and a central cavity along an axis. The fluted filter media comprises a face sheet and a convoluted sheet, wherein the convoluted sheet is attached to the face sheet and wound in a coiled configuration about the axis to define a plurality of flutes. Each of the flutes is closed proximate both opposed axial ends, wherein the fluted filter media defines radial fluid flow path between an outer periphery of the fluted filter media and the central cavity (e.g. either radially inward or outward flow, or both).

In yet another aspect, the invention provides a method of making a filter element comprising steps of forming a filter media having a plurality of pockets about a central axis, filling the plurality of pockets with a contaminant adsorbent material, and sealing opposing axial ends of the filter media.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

According to embodiments of the present invention, a filter element includes a plurality of pockets formed of a filter media wherein contaminant adsorbent material is enclosed for treatment of contaminated fluids. An exemplary contaminant adsorbent material used according to embodiments is preferably a nanoadsorbent material manufactured from self-assembled monolayers on mesoporous supports (SAMMS). An exemplary filter media to provide the pockets is fluted filter media. However, it will be appreciated that broader aspects of the present invention may be applicable to other containment adsorbents and filter medias.

Figure 1:
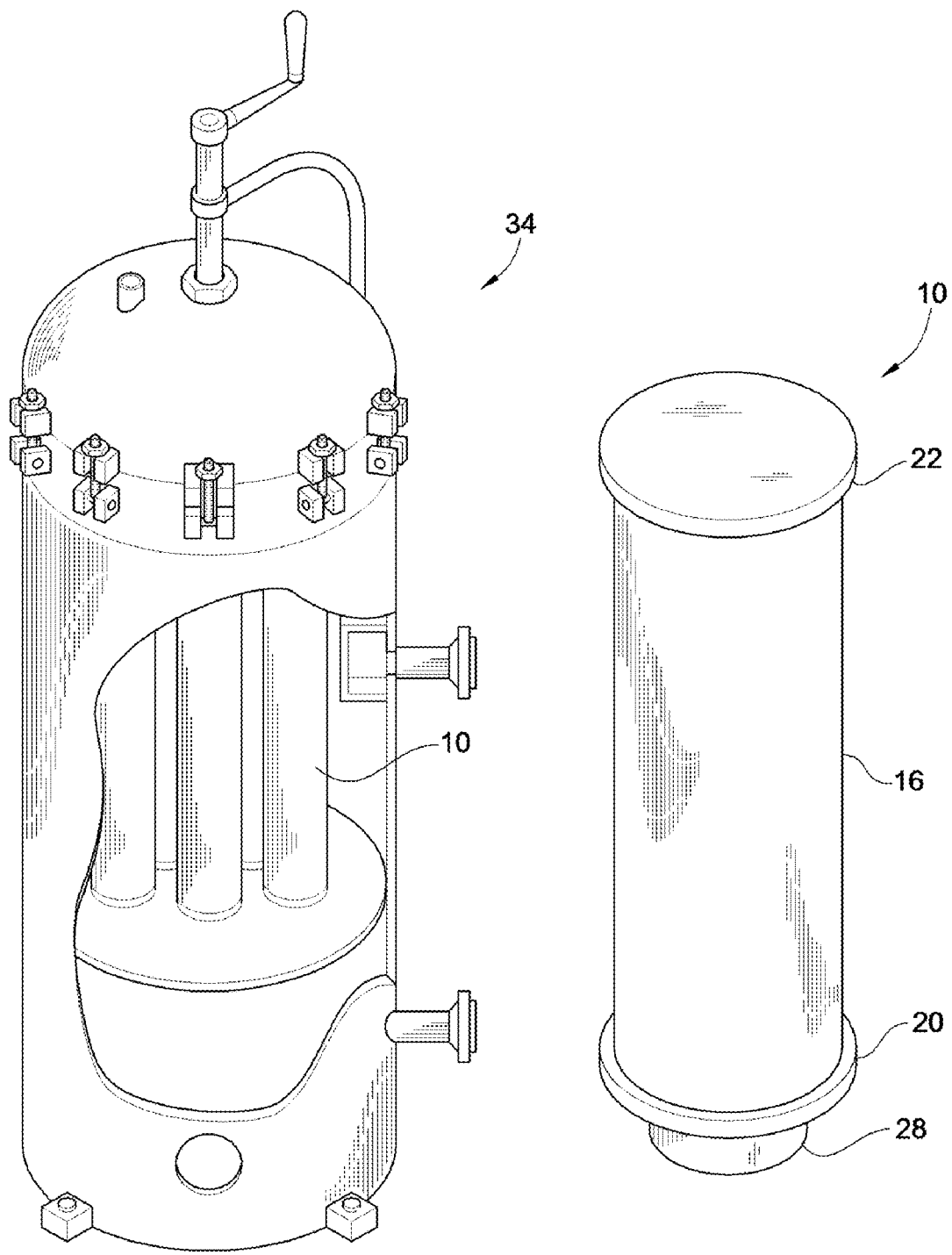
FIG. 1 is a partial cut-away and partially schematic perspective illustration of a filtration vessel having a plurality of cylindrical contaminant adsorbent filter element therein.

FIG. 1 shows one embodiment of the present invention in the form of a filter element 10, adapted for insertion into a filtration vessel 34 through which contaminated fluid may be directed for subsequent removal of contaminants within the fluid therefrom. In the vessel 34, the filter elements 10 are immersed in a flow of contaminated fluid to permit removal of contaminants by contaminant adsorbent material trapped in the filter media pocket of the filter elements 10.

Fluids which may be treated in connection with the present invention maybe viscous, such as oil, or non-viscous, such as a liquid or gas. Contaminants that may be removed by the filter element 10 includes, but not limited to, heavy metals such as mercury, cadmium, arsenic, and lead from complex fluids or contaminated streams, such as produced water, and mercury from variety of contaminated solutions and contaminated oils. The term fluid as used herein is intended to include either liquid or gas.

The filter element 10 shown in FIG. 1 is generally cylindrical shape comprising a fluted filter media 16, and end caps 20, 22. Preferably, the filter element 10 is constructed to be relatively long and narrow, i.e. a large length to perimeter ratio. Typically, the filter element 10 is constructed to have a length to perimeter between 0.3 to 6, preferably between 1 to 3. For example, filters may have an axial length of between 5 and 88 inches, and a substantially circular cross section with a diameter of between 3 and 6 inches; and a perimeter of between 9 and 18 inches. In other embodiments, the filter element 10 may be configured to have various shapes such as race track, oval, or rectangular cross sections.

Figure 2:
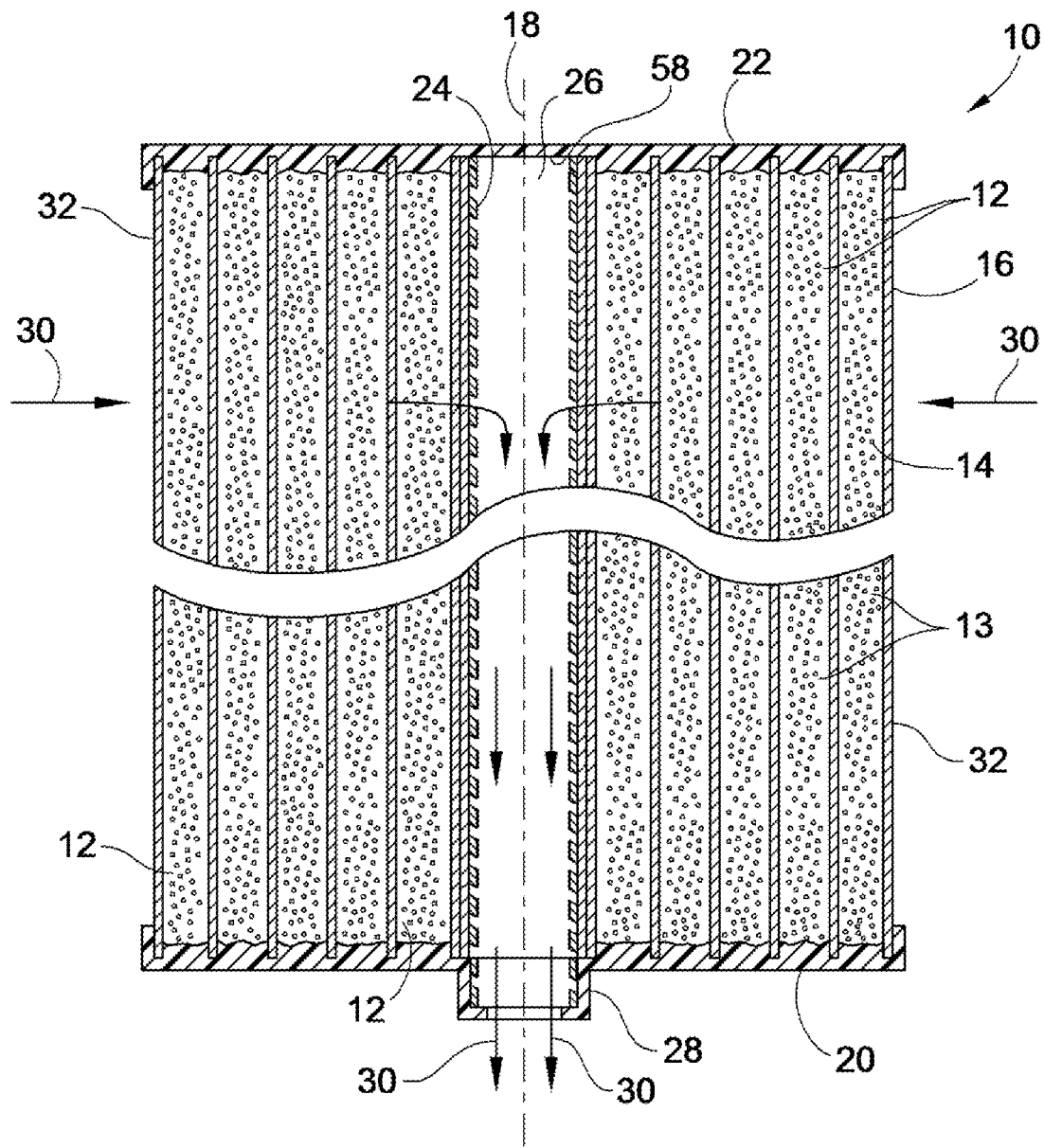
FIG. 2 is a schematic cross sectional view of a contaminant adsorbent filter element wherein end caps are sealed by a plastic welding method according to an embodiment of the present invention.

A schematic cross sectional illustration of the filter element 10 is shown in FIG. 2, which provides a general overview of the filter element 10 having a plurality of pockets 12 filled with contaminant adsorbent material. In this embodiment, the plurality of pockets 12 is provided by the plurality of flutes 13. As shown, the fluted filter media 16 having a plurality of flutes 13 is formed around a perforated core 24 extending about a central axis 18. The plurality of flutes 13 is filled with a SAMMS material 14 and attached to the pair of end caps 20, 22 at opposed axial ends.

One of the end caps is an open end cap 20 having an opening in the center defining a fluid port 28 which provides communication with a central chamber 26. The open end cap 20 may be sealingly bonded to one end of the fluid filter media 16. The other end of the filter media 16 may be sealingly bonded to a closed end cap 22. By sealingly bonded, it is meant that it is integrally bonded such as by plastic welding as may be the case with plastic end caps or may be potted with plastisol or other adhesive material or otherwise attached with a sealing relationship to enclose the SAMMS material 14 within the flutes 13.

Conventionally, fluted filter elements are configured to have an axial fluid flow path as described in U.S. Patent Publication No. 2006/0091084, entitled "Fluted Filter Media with Intermediate Flow Restriction and Method of Making Same," assigned to the Assignee of the present invention and incorporated herein by reference. In such fluted filter elements, a fluid flows axially from one flow face, through the fluted filter media longitudinally, to the opposing flow face.

In contrast, the filter element 10 of the present invention can be configured as a radial flow filter element. In filter element 10, the fluid port 28 may either be an inlet port or an outlet port depending upon the flow configuration. That is, a fluid may flow radially inward from the outer periphery 32 of the fluted filter media 16, through the plurality of flutes 13 filled with the SAMMS 14 and into the central chamber 26, wherein it may flow axially toward the fluid port 28, then exit through the fluid port 28, as shown by a fluid path 30. Alternatively, the fluid port 28 may be an inlet port in which an unfiltered fluid enters the fluid port 28, and flows axially through the central chamber 26, then flows radially through the plurality of the flutes 13 filled with the SAMMS 14 toward the outer periphery 32, and exit through the outer periphery 32 of the fluted filter media 16. In one embodiment a fluid may travel through between 3 and 30 layers of the face sheets 42 and the convoluted sheets 40. As the fluid flows through the filter element 10, solids and contaminants in the fluid may be filtered by the convoluted sheets 40 and the face sheets 42, and adsorbed by the SAMMS material 14. Alternatively, the convoluted sheet 40 and the face sheet 42 may merely hold and fix the SAMMS material 14 within the filter element 10 without performing a filtration function. For example, the filter element 10 may be used in a multi-stage filtration/contamination removal system, wherein a separate filter element including a superior solid filtration capability than the convoluted sheet 40 and the face sheet 42 is provided in the upstream of the filter element 10. As such, substantially all solids may be filtered by the upstream filter element, and thus, the convoluted sheet 40 and the face sheet 42 may not perform filtration function.

Figure 5:
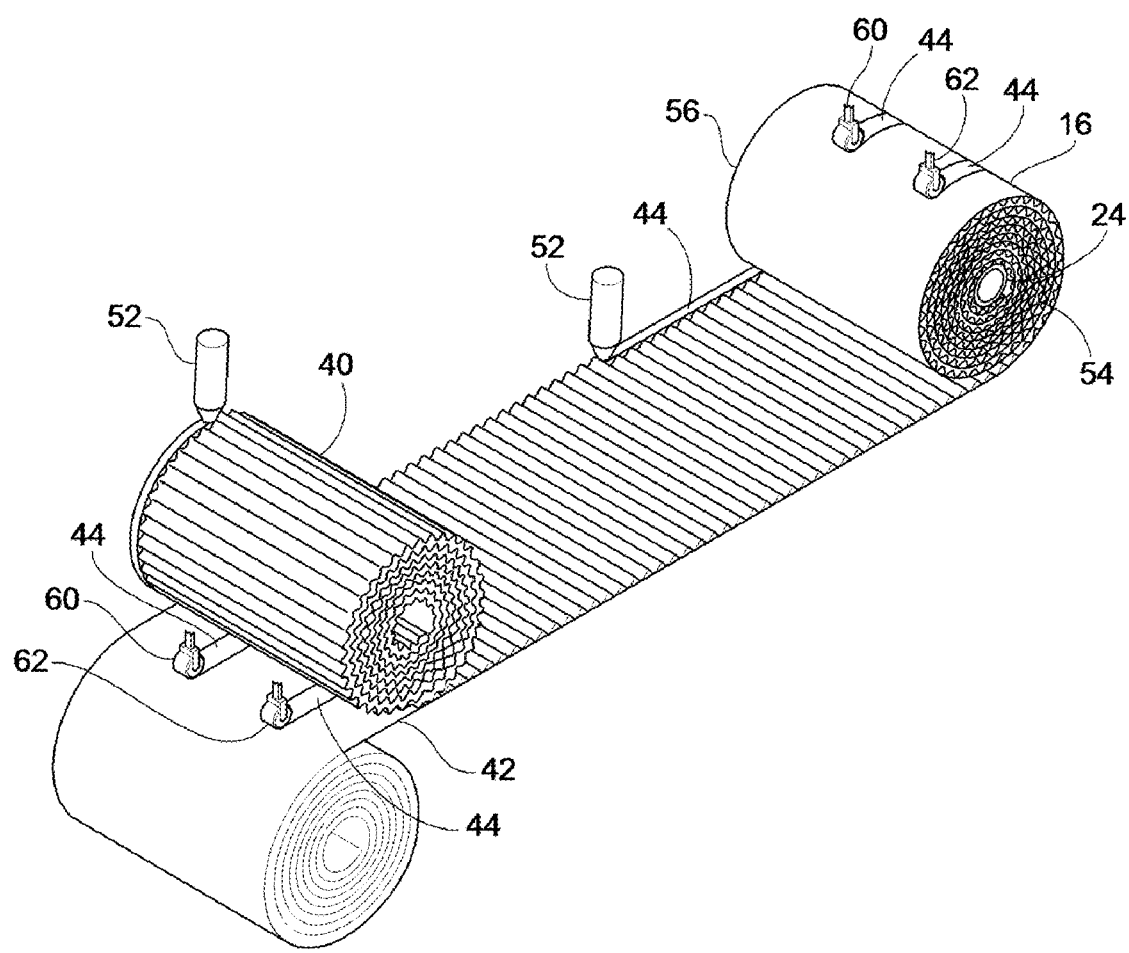
FIG. 5 is a schematic illustration depicting a method of making a fluted filter media wherein one end of the fluted filter media is sealed with adhesive according to one embodiment.

FIG. 5 illustrates a construction of the fluted filter media 16. The fluted filter media 16 may be formed from a convoluted sheet 40 secured together with a face sheet 42. Each of the convoluted sheet 40 and the face sheet 42 are made of a porous filter media. The convoluted sheet 40 and the face sheet 42 may be formed from a same filter media or different filter medias. For example, the convoluted sheet 40 may be formed of a filter media that is less open than a filter media used to form the face sheet 42. One embodiment, each of the convoluted sheet 40 and the face sheet 42 are constructed from a same porous filter media having characteristics of: (a) a Frazier Permeability between about 6 and about 20 CFM @ 5" WG, an average fiber diameter of between about 2 and about 50 microns, a base weight of between about 30 and about 200 lb/3000 ft$^2$, an average pore size generally between about 2 and about 80 microns, and a Mullen burst strength between about 5 and about 100 psi.

The convoluted sheet 40 may be formed by any appropriate process, such as corrugating or pleating, but preferably by gathering as described in U.S. patent application Ser. No. 10/979,390, entitled "Gathered Filter Media for an Air Filter and Method of Making Same," assigned to the Assignee of the present invention, and incorporated herein by reference. As shown in FIG. 5, the convoluted sheet of porous filter material 40 forms a plurality of contiguous adjacent convolutions, commonly known in the industry as flutes. That is, the convoluted sheet 40 forms peaks and valleys, then the convoluted sheet 40 is attached to the face sheet 42, with adjacent peaks being generally regularly spaced from one another.

The face sheet 42 is attached to the convoluted sheet 40 and retains the convoluted sheet 40 in a convoluted state. The face sheet 42 may be attached to the convoluted sheet 40 in any appropriate manner, such as by beads of adhesive 44 applied at junctures of the convoluted sheet 40 and the face sheet 42. As illustrated in FIG. 5, alternating layers of the face sheet 42 and the convoluted sheet 40 are secured to one another with adhesive 44 disposed on the face sheets 42. An adequate amount of the adhesive 44 is applied to secure the convoluted sheet 40 to the face sheet 42 without blocking pockets formed in the flutes 13. The face sheet 42 is shown as a flat sheet of porous material, however, the face sheet 42 may not be flat in other embodiments. For example, the face sheet 42 may include convolutions or pleated in various directions.

In conventional axial flow filter elements, selected ends of the flutes may be blocked, with a bead of adhesive, for example, to cause fluid entering one end of some of the flutes to flow through the porous filter media into other flutes prior to exiting the filter media at an opposite end of the flutes, in the manner known in the art. However, as discussed above, the filter element 10 according to the present invention is a radial flow filter element with the flow paths between the outer periphery 32 of the fluted filter media 16 and the fluid port 28. The flutes 13 of this embodiment are filled with the SAMMS 14 and sealed at both ends to prevent a fluid from exiting out though open ends of flutes 13. The sealed flutes also contain the SAMMS powder particles 14 within the flutes 13.

Further, the filter element 10 comprising a radial flow fluted filter media according to the present invention includes the convoluted sheet 40 and the face sheet 42, both of which are formed of a porous filter material to allow a fluid to flow radially across multiple layers of convoluted sheet 40 and face sheet 42. The flutes 13 formed by the convoluted sheet 40 are substantially equal in size and equally spaced in this embodiment, but in other embodiments of the invention, this need not necessarily be the case.

The fluted filter media 16 is coiled around the core 24. The core 24 as shown in FIGS. 1-7 includes a cylindrical wall 58 and a center cavity defining the central chamber 26. The wall 58 of the core 24 is perforated to allow a fluid to flow through the perforation into/from the center chamber 26. The core 24 may be formed into various shapes from any suitable materials such as a polymeric material. The shape of the core can determine a general shape of the filter element 10, as the fluted filter media 16 is wound on the core 24. For example, the cylindrical core 24 of this embodiment can form the cylindrically shaped filter media pack 16 as shown in FIGS. 1 and 7. In other embodiments, the filter media pack may be formed into other shapes having a non-circular cross section such as a race-track shape or rectangular shape.

During a winding process, a leading edge of the fluted filter media 16 including the convoluted sheet 40 secured together with the face sheet 42 may be taped to the surface of the core 24, then wound on the central core 24. In some embodiments, an optional layer 25 of porous filter media material may be provided between the core 42 and the fluted filter media 16. That is, the optional layer 25 is wound on the core 24 first, then the fluted filter media 16 can be wound on the top of the optional layer 25. In such embodiments, the optional layer 25 may be constructed with a same filter media material as the filter media material of one of the convoluted sheet 40 and the face sheet 42, or may be formed of a different filter media material. Preferably, the optional layer 25 is formed of a filter media material having a better filtration efficiency against the SAMMS powder particulates than the filter media materials forming the convoluted sheet 40 and the face sheet 42, such that any SAMMS powder particulates that move across the convoluted sheet 40 and the face sheet 42 may be contained, thereby, minimizing amount of SAMMS powder particulates in a filtered fluid stream. As discussed above, an adequate amount of adhesive 44 is applied on the face sheet 42 to secure together the convoluted sheet 40 and the face sheet 42 as the face sheet 42 and the convoluted sheet 40 are wound together on the core 24. In other embodiments, the fluted filter media 16 may be formed without a core 24.

Figure 4:
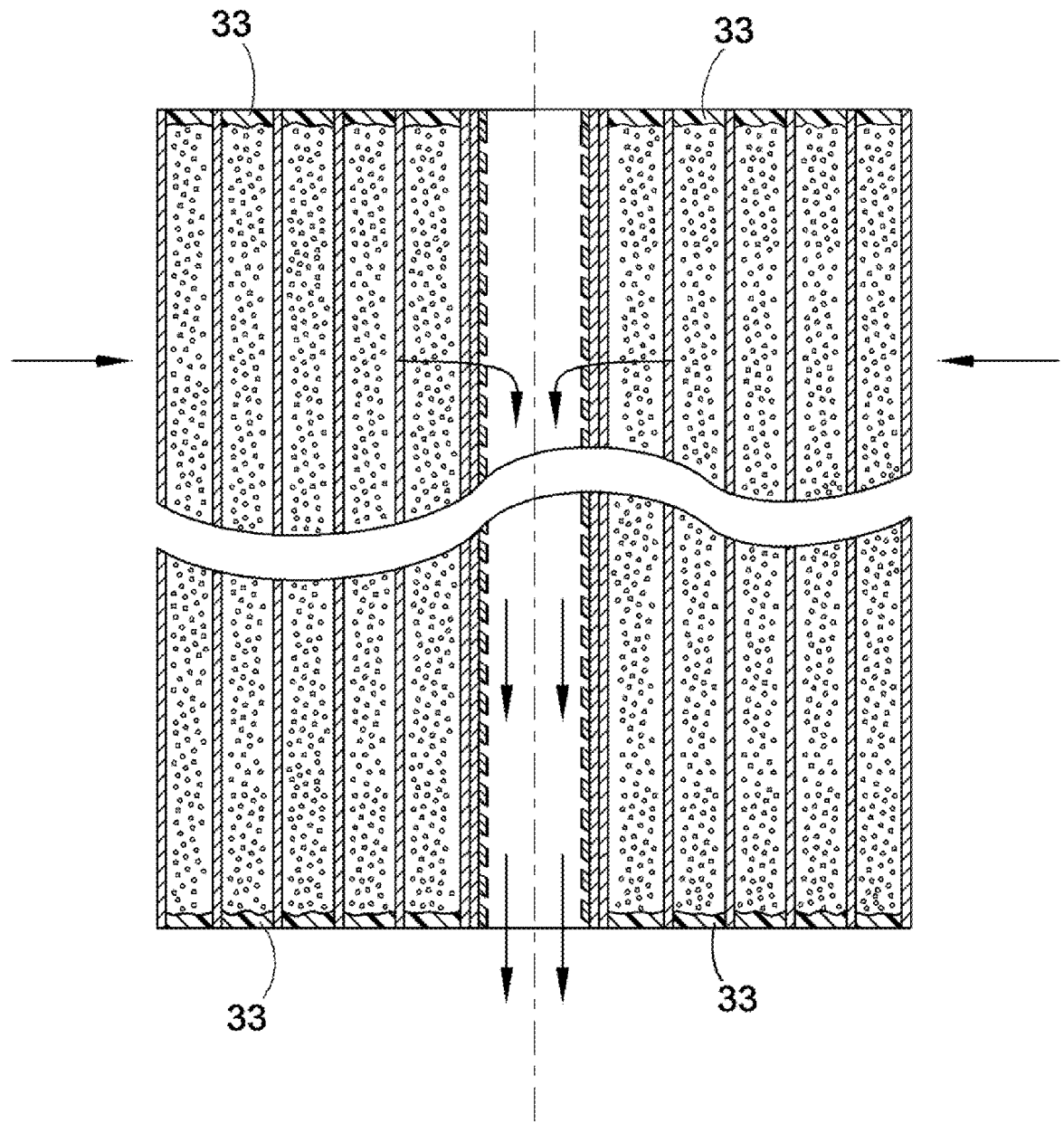
FIG. 4 is a schematic cross sectional view of a contaminant adsorbent filter element wherein end caps are formed by plugs according to yet another embodiment of the present invention.

The flutes 13 of the fluted filter media 16 shown in FIG. 5 are sealed at one end with adhesive 44 applied on the convoluted sheet 40 approximate one edge by an adhesive applicator 52. Since the purpose of applying adhesive 44 using the applicator 52 is to seal the end of the flutes 13, the applicator 52 may apply more adhesive than the other applicators 60, 62, such that the excess adhesive can fill the flutes 13 formed as the face sheet 42 is attached to the convoluted sheet 40 and wound on the core 24. As shown in FIG. 4, the adhesive 44 applied on the edge (see FIG. 5) forms plugs 33 which may define an end cap. In other embodiments, the closed end cap 22 may additionally attached to the closed end of the fluted filter media 16, such that the closed flute face of the filter media 16 is secured to the closed end cap 22 as shown in FIG. 7.

Figure 3:
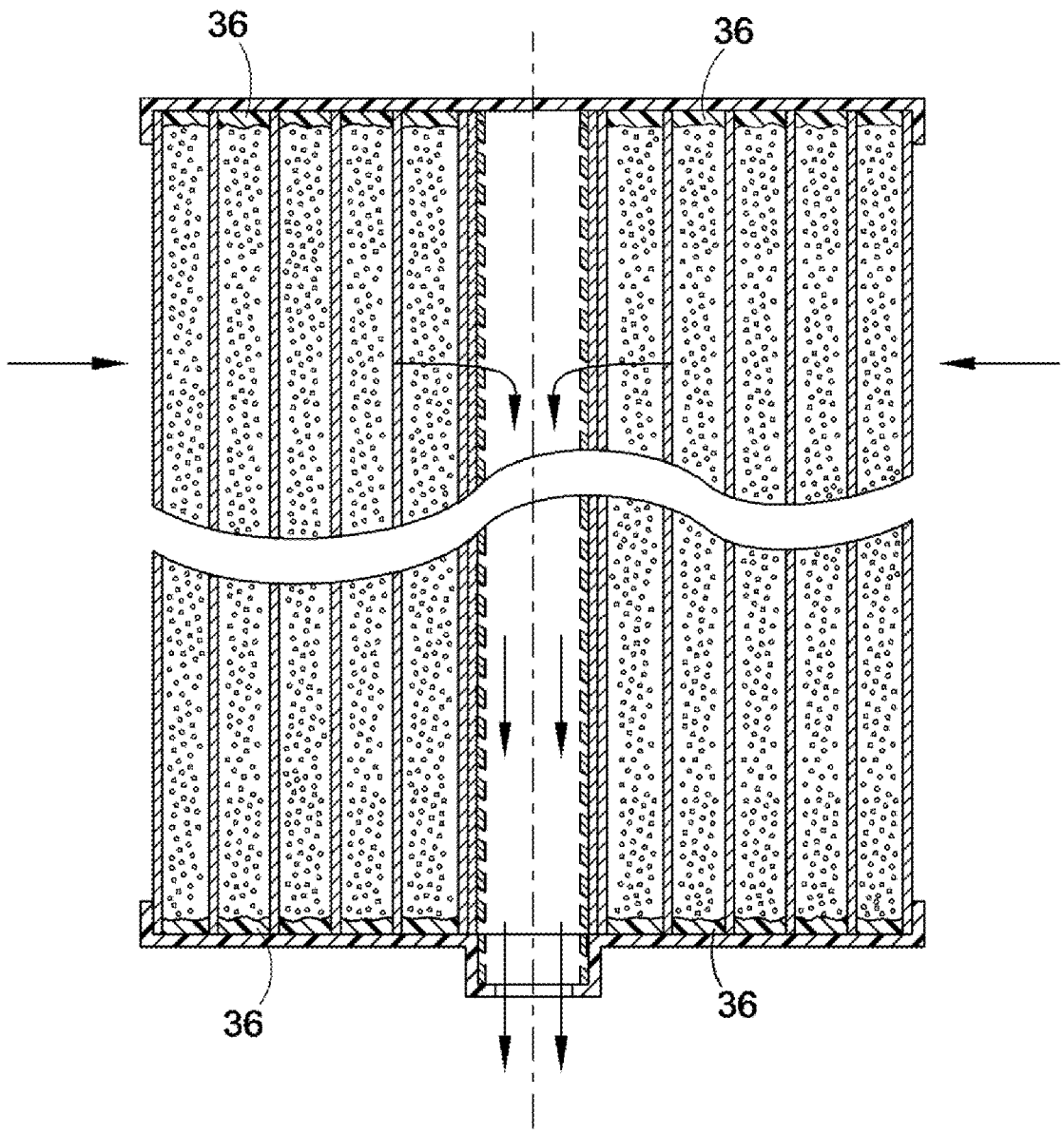
FIG. 3 is a schematic cross sectional view of a contaminant adsorbent filter element wherein end caps are sealed using a sealing material filled in the end caps according to a different embodiment of the present invention.
Figure 6:
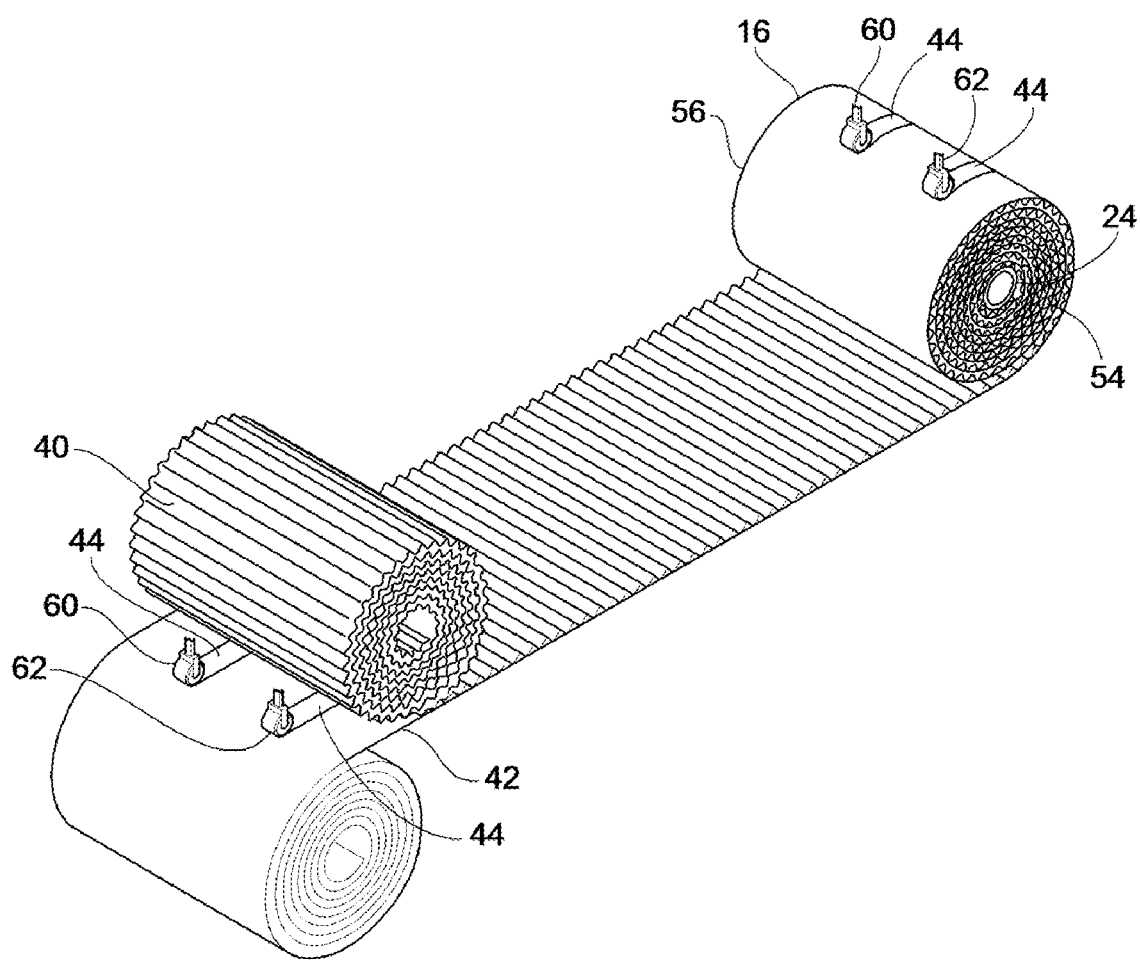
FIG. 6 is a schematic illustration depicting a method of making a fluted filter media wherein both ends of the fluted filter media are left open according to a different embodiment.
Figure 7:
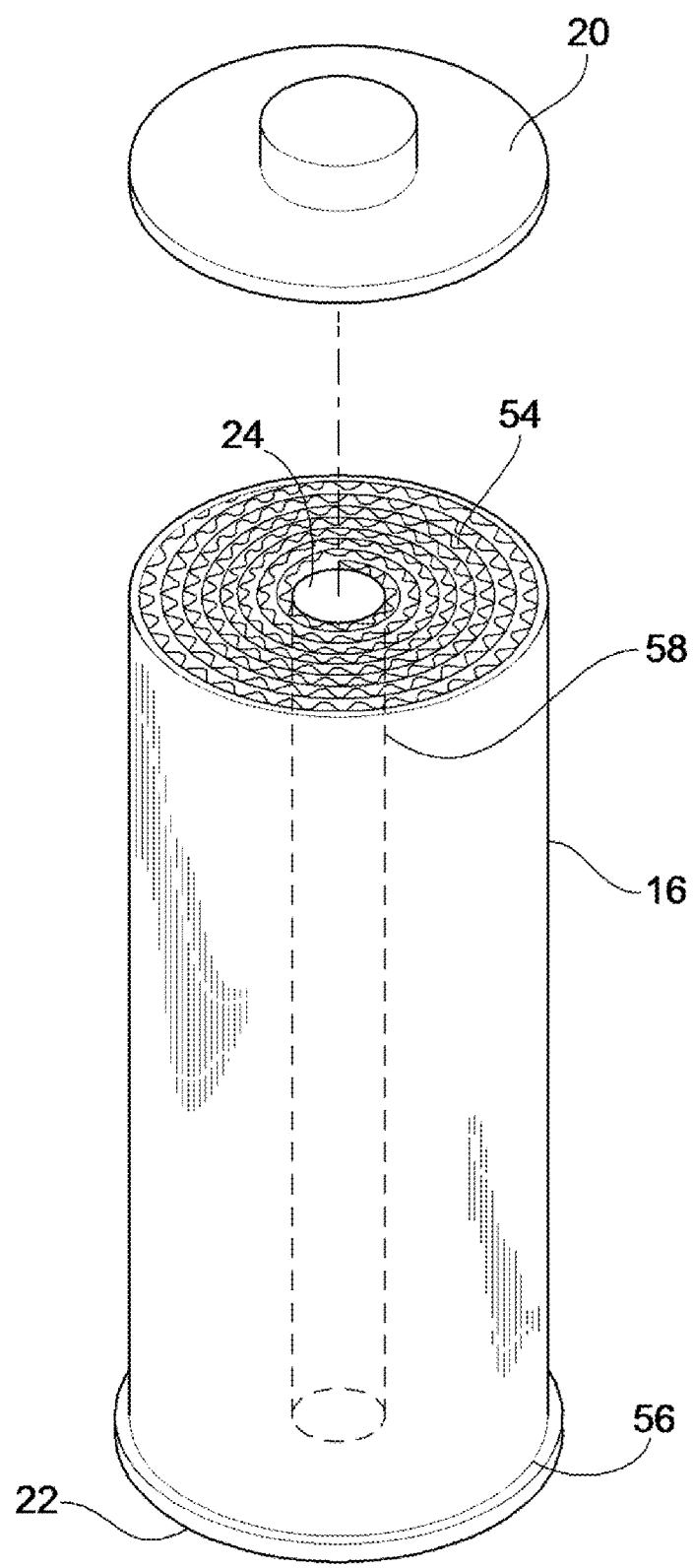
FIG. 7 is a perspective view of a fluted filter media, ready to be filled with SAMMS powder particles according to on embodiment.

Alternatively, as shown in FIG. 6, the flutes 13 of the fluted filter media 16 may not be closed by adhesive 44. In such an embodiment, both ends of the flutes 13 are left open. Once a web of the fluted filter media pack 16 is formed on the core 24, the closed end cap 22 may be sealingly attached to one of the fluted filter media pack 16. Referring to FIG. 3, one way to sealingly attaching the closed end cap 22 is by filling the closed end cap 22 with a plastisol material 36 and pressing the plastisol filled closed end cap 22 to the one end of the fluted filter media pack 16 such that some of the plastisol material 36 enters openings formed by the flutes 13, thereby sealing the interface between the close end cap 22 and the fluted filter media pack 16. Alternatively, other suitable sealing materials or adhesives may be used instead of the plastisol. In other embodiments, the open end cap 20 may be sealingly bonded to the fluted filter media pack 16 first.

Now referring to FIG. 2, another way of sealingly attaching an end cap to the fluted filter media 16 is by a plastic welding process, wherein a portion of the end cap adjacent to one end of the fluted filter media 16 is formed of a suitable thermoplastic material, wherein the thermoplastic material portion of the end cap is heated to soft, and pressed against one end of filter media 16 such that some of the softened thermoplastic material enters openings formed by the flutes, thereby sealingly attaching the fluted filter media 16 and the end cap. The material of end caps in FIG. 2 (and other embodiments) could alternatively be a molded in place material such as foamed urethane.

Once the closed end cap 22 is attached to the one end of the fluted filter media 16, the fluted filter media 16 is placed with the open flute face up such that the SAMMS powder material can be filled and packed into each of the flutes 13. Typically, the flutes 13 can be packed with 0.2 to 0.50 g/cm³ SAMMS, preferably, 0.25 to 0.35 g/cm³.

After the flutes 13 are packed with the SAMMS powder material 14, the open end cap 20 is sealingly attached to the open flute face 54. The open end cap 20 may be sealed to the open flute face 54 by any adequate methods including methods described above with regard to sealingly attaching the closed end cap 22 to one end of the fluted filter media pack 16. For example, the open end cap 20 may be first applied with a platisol material then pressed onto the open flute face 54. Then, the filter element 10 may be flipped over and further pressed to sealingly attach the open end cap 20.

Figure 8:
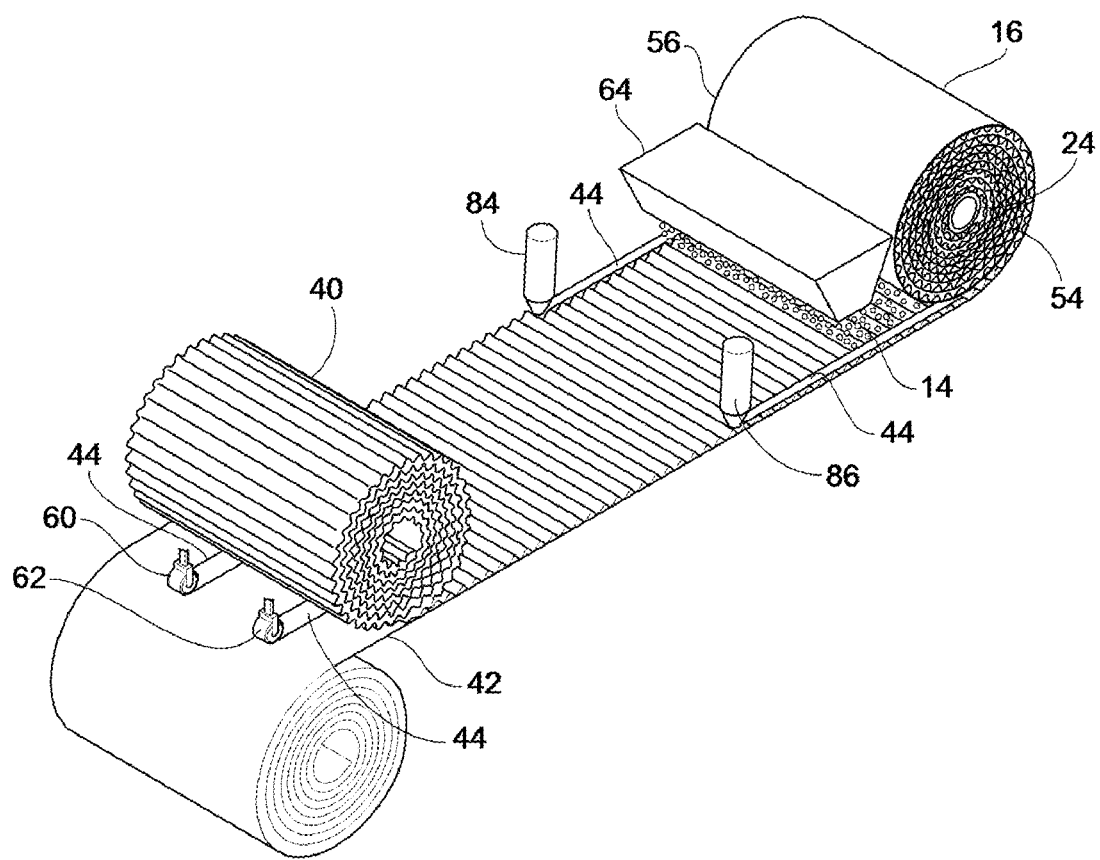
FIG. 8 is a schematic illustration depicting a method of making a fluted filter media, wherein SAMMS powder particle is filled during the process of making the fluted filter media, wherein both ends of the fluted filter media are sealed with adhesive according to one embodiment.

In an alternative embodiment, the SAMMS powder material 14 may be filled as the fluted filter media 16 is formed and wound on the core 24. Such embodiment is shown in FIG. 8, wherein the SAMMS powder material 14 is deposited on the convoluted sheet 40 via a feeding device 64. The amount of the SAMMS powder material 14 fed may be controlled to fill each of the flutes 13 without overflowing. As shown, each end of the flutes 13 are closed with the adhesive 44 applied via the adhesive applicators 84 and 86. The resulting fluted filter media 16 will have the half of the flutes 13 filled with the SAMMS powder material 14. In other embodiments, a second SAMMS feeding device may be installed in the front end to fill the flutes 13 as the convoluted sheet 40 is laminated to the face sheet 42. Thus, all of the flutes 13 in such embodiments are filled with the SAMMS powder material 14. In this embodiment each end of the fluted filter media 16 is sealed with plugs 33, as shown in FIG. 2, formed by the adhesive 44, which can function as end caps. In some embodiments, additional end caps 20, 22 may be attached to the SAMMS filled fluted filter media 16.

The open end cap 20 may include an appropriate annular seal to provide for sealing of the filter element when it is installed into an appropriate filtration vessel 34. Additionally, a pre-filter outer wrap or jacket may also be affixed around the outer periphery 32 of the filter element 10 such that prior to passing through the SAMMS filled flutes 13, a contaminated fluid may first flow through a particulate loading filtration media. It is also understood that the invention is not limited to a filter media pack of fluted media. Those having skill in the art will readily recognize that the invention may also be practiced with efficacy, using other types of filter media having a plurality of pockets. It will also be recognized that each embodiment of FIGS. 2-4 and 7 each include end caps at either end that may be a unitary one piece end cap as shown in FIGS. 2 and 4 or an end cap assembly of different materials as shown in FIG. 3.

In the embodiments according to the present invention, the SAMMS powder material 14 is trapped in the plurality of flutes 13 such that channeling and short-circuiting of fluid though an unsecured packed SAMMS particle bed can be avoided. In such industrial filtration applications, a sizeable flow rate can be experienced which can channel and/or otherwise move SAMMS powder particles to create uneven flow through a packed powder bed. For example, flux rates based upon perimeter surface area in filtration applications such as embodiments herein may be between about 0.1 cubic meters per hour per square meter and 2.0 cubic meters per hour per square meter for liquids and other fluids. By capturing the SAMMS powder particles into the plurality of pockets, uniform loading of toxic metals may be achieved throughout the structured bed, and fluid flow does not cause displacement of the SAMMS powder material. That is, the SAMMS powder material is generally fixed within each pocket and maintained in communication with fluid flow supported by the fluted filter media structure.

A mesoporous support of a nanosorbent material manufactured from self-assembled monolayers on mesoporous supports (SAMMS), in an embodiment, may be formed from various porous material, including silica, alumina, zeolite or other suitable mesoporous material. During a manufacturing process of a SAMMS, the mesoporous support is deposited with self-assembled monolayer along its outer surface which are functionalize to provide a desired contaminant adsorbent property. For example, functionalizing the mesoporous material with a thiol group provides for mercury adsorption property. Other functional molecules may be used in the alternative and/or in combination to provide for different contaminant adsorption properties, which may include, but not limited to, thiol, amine, thioalkoxide, polycarboxylic acids, ehtylenediamine, bipyridyl, phenanthroline, phenols, polyhydroxyaromatic, carbonyl compounds, phosphine, phosphine oxide, isonitrile and combinations thereof. Target metals or metal compounds that may be bound include but not limited to As, Bi, Cd, Co, Cu, Pb, Hg, Ni, Pt, Ru, Rh, Se, Ag and combinations thereof.

An example of a SAMMS that can be used in connection with the present invention is thiol-SAMMS, such as that disclosed in U.S. Pat. No. 6,326,326, the entire disclosure of which is hereby incorporated by reference. Other examples of the contaminant adsorbent material which can used in the present invention includes, but not limited to, commercially available carbon particles having a particle size ranging from about 8 to about 30 mesh in size. Commercially available SAMMS powders are available from Steward Environmental Solutions.

The SAMMS material 14 may include porous particles ranging from about 1 micron to about 200 microns in size, preferably with an average particle size between 10 microns-100 microns, more preferably, with at least 90% of particles by weight between 20 microns-100 microns. In one embodiment, the SAMMS material 14 has a mean particle size between 20 microns-100 microns, more preferably, between 30 microns-80 microns. The contaminant adsorbent porous particles may include a pore size ranging from about 2 nanometers (nm) to about 7 nm and may be provided with an apparent density ranging from about 0.2 grams/milliliter to about 0.4 grams/milliliter.

Considering the size of the contaminant adsorbent material particle size, the filter media 16 having the plurality of pockets 12 is formed from an appropriate filter media material having a porosity to contain the contaminant adsorbent particles within each of the plurality of pockets 12 and to minimize movement of the contaminant adsorbent particles across each of the plurality of pockets 12. For example, in an embodiment, at least one of the face sheet 42 and the convoluted sheet 40 of the fluted filter media 16 has filtration efficiency of greater than 99% for the average particle size of the SAMMS particulate powder 14.

The mesoporous material such as SAMMS 14 is typically a form of a molecular sieve that possesses ordered pores on a submicrons level (e.g. pore sizes typically between 2 and 30 nanometers, and more typically 3-4 nanometers in one embodiment), typically with a narrow size distribution, and a high surface area (up to 1200 square meters/g) with an apparent density that may range from about 0.2 grams/milliliter to about 0.4 grams/milliliter. The mesoporous material 14 substantially fills each of the plurality of flutes 13, and as a fluid flows through the fluted filter media 16 filled with the mesoporous material 14, the functional molecules carried on the surface of the mesoporous material particles 14 are subjected to and interact with the fluid and adsorb contaminant in a fluid stream. However, the flow rate of fluid through a filter element is not controlled by the characteristics of these mesopores. Rather, the mesopores increase functional surface area and ability for functional molecules to act as a contaminant adsorbent. Fluid flow rate through filter element is substantially determined and thereby controlled the density of the mesoporous material 14 trapped in the plurality of flutes 13 (e.g. amount of the mesoporous material packed in each of the flutes), and porosity of the fluted filter media 16.

In one embodiment, a contaminated fluid may flow through the filter element 10 in a radial fluid path as described previously, wherein the contaminated fluid is permitted to flow through the pores of the particles in the SAMMS powder material. Within these pores, particular contaminants, such as heavy metals (e.g. mercury) come in contact with a monolayer of chemical designed to attract and bind the molecules of these contaminants. As such, these particular contaminants may bond to the SAMMS and removed from the fluid. Once the SAMMS material is used up or spent, the filter element 10 can be changed to a new filter element in the vessel 34. To the extent desired, the spent SAMMS may be regenerated. In particular, the spent SAMMS may be treated with an acidic fluid to remove the adsorbed contaminant.

To determine when the SAMMS material may be used up, several approaches may be implemented. For example, as the filter element 10 is loaded with contaminants, its differential pressure may increase. This is because contaminants in the fluid once trapped by the SAMMS material will tend to plug the tightly packed SAMMS material over time. As such, it will be important to monitor the differential pressure of the filter media 10. Further, although the primary purpose of the SAMMS material is to adsorb a particular contaminant, due to its small particle size (i.e. from about 5 microns to about 200 microns), the SAMMS may also be a very good solids filter. This ability to filter solids can result in the SAMMS material be spent of plugged sooner than otherwise necessary.

To that end, the convoluted sheet 40 and the face sheet 42 can increase a life span of the SAMMS material, since solids can be filtered by these sheets. Additional filter medias maybe provided strategically in the vessel 34 to filter solids before the contaminated fluid reach the filter element 10 to minimize plugging by solids, for example, a pre-filter either in the same filter element or more preferably in a separate upstream particulate filtration element (either surface loading barrier filtration or depth loading filtration or a combination thereof.) Preferably, such a pre-filter should have an absolute efficiency rating (e.g. greater than 90%) for the standard operating fluid flow rate of an application of between about 1 microns and about 5 microns, and more preferably at least a 3 microns efficiency pre-filter or better.

In other approach, the status of the SAMMS may be determined by periodically or continuously monitoring the level of contaminants of the treated fluid in an outlet stream. When the level in the outlet stream increases to a certain point, the filter element 10 may be changed or regenrated.

Figure 9:
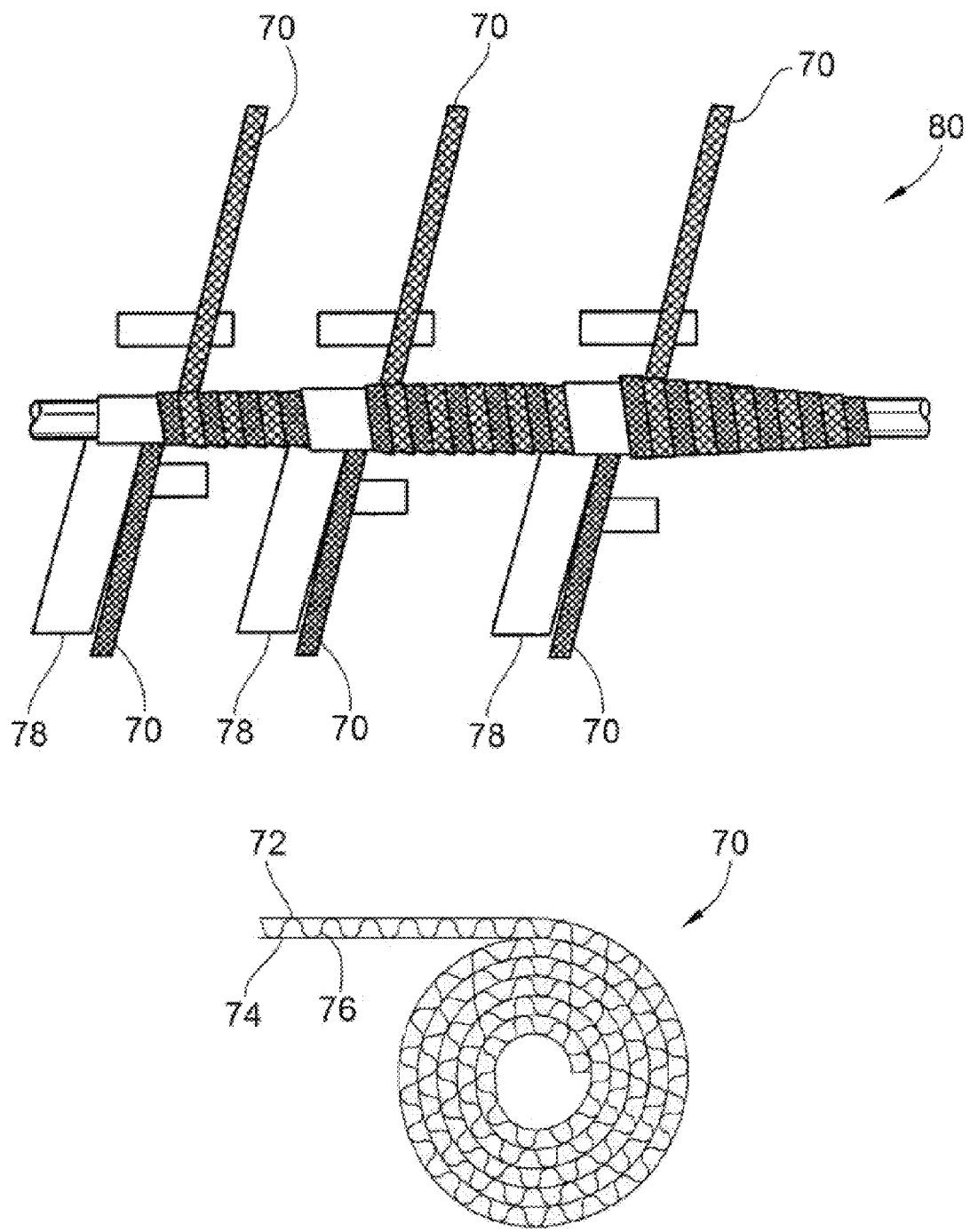
FIG. 9 is a schematic illustration of a helical winding methodology for winding a contaminant adsorbent filter element according to one embodiment.

Turning to FIG. 9, another generally cylindrical filter element and method for making the same is illustrated in which a fluted filter media 70 and other suitable filter material may be wound into helically configured filter element 80. This can be done according to the principles of U.S. Pat. No. 5,893,956 entitle: "Method of Making Filter Element"; and/or pending Patent Application Publication No. 2008/0128364, entitled: "Filter Element and Method of Manufacturing and Using Same" filed by Dan Cloud and John A. Krogue with a filing date of Dec. 1, 2006; these patent documents are assigned to the present assignee and the entire disclosures of these two patent documents are hereby incorporated by reference in their entireties.

In this embodiment, the fluted filter media 70 is constructed with a convoluted sheet 76 attached to face sheets 72, 74 on each side of the convoluted sheet 76. The filter media 70 is filled with the SAMMS powder material 14 using methods similar to the method described previously for the embodiment shown in FIG. 8.

As shown in FIG. 9, multi-overlapped filter element 80 is formed from the SAMMS filled fluted filter media 70 and other suitable filter media 78. The other suitable filter media 78 may be the SAMMS filled fluted filter media 70, a depth loading or surface/barrier loading filtration media, a porous spacer element that provides little or no filtration, a SAMMS coated lattice structure, or other suitable media. While only one of the strips shown in FIG. 9 may be filled with SAMMS or coated with SAMMS, it is understood that all of the strips may include SAMMS such as the SAMMS filled fluted filter media or different types of SAMMS coated wire mesh material as disclosed in U.S. Provisional Patent Application No. 61/056,898, entitled "Contaminant Adsorption Filtration Media, Elements, Systems and Methods Employing Wire or Other Lattice Support" which is assigned to the present assignee and the entire disclosure of which is hereby incorporated by reference in their entirety.

As it was with the filter element 10, the helically wound filter element 80 may include a perforated core 24 and end caps 20, 22 sealingly bonded to each end of the filter element 80. Again, one end cap 20 is open, defining the fluid port 28 that communicates with the central chamber 26, and may carry a seal to provide for sealing with a housing vessel 34. The fluid flows generally radially through the filter element 80 as previously described with regard to the filter element 10.

The filter element 80 may be constructed only as a contaminant adsorption media with filter media including SAMMS material such as the SAMMS filled fluted filter media and SAMMS coated wire mesh strips either with or without more porous spacer strips that really do not serve a filtration function. Alternatively, the filter element 80 may be configured as a combination waste adsorption and particulate loading filtration element (with barrier filtration and/or depth filtration loading). More conventional polymeric filter media materials may be wound in combination with the SAMMS filled fluted filter media and/or SAMMS coated wire mesh material. Different configurations can be employed and the teachings of the U.S. patent records noted above may be used to create different configurations.

The filter element 10 as described above is filled with a contaminant adsorbent material such as the SAMMS material 14 to remove contaminants from a fluid. However, in other embodiments, the filter element 10 may also be used without any contaminant adsorbent material. For example, each of the flutes 13 of the filter element 10 may be plugged using one of the methods discussed previously, such that fluid cannot enter or exit from openings formed by the flutes 13. As discussed above, such filter element construction results in a fluted filter element having a radial flow path. The flutes 13 in such embodiments can remain void, wherein the convoluted sheet 40 and the face sheet 42 may perform filtration of solids as the fluid travels between the outer periphery 32 of the filter element and the core 24. In other embodiments, the flutes 13 may be filled with other suitable solid filtration materials.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element, comprising:
   a filter media having a plurality of pockets formed therein about a central axis;
   a pair of end caps affixed to opposing axial ends of the filter media a contaminant adsorbent material trapped in the plurality of pockets; and
   circumferential partitions separating the pockets radially, wherein the pockets are layered radially about the central axis, wherein the pockets are separated by axially extending partitions, wherein the pockets are angularly spaced about the central axis, and wherein a radial flow path travels through the layered pockets.

2. The filter element of claim 1, wherein the filter media is a fluted filter media comprising a face sheet; and a convoluted sheet of material defining flutes extending generally between opposed axial ends, the convoluted sheet being attached to the face sheet and wound in a coiled configuration about the central axis to define a plurality of flutes to provide the plurality of pockets.

3. The filter element of claim 2, wherein the flutes are closed proximate at least one axial end of the filter media by a sealing composition applied between the convoluted sheet and the face sheet, wherein the sealing composition forms a plurality of plugs closing each of the plurality of the flutes; the plurality of plugs providing at least in part or in whole the pair of end caps.

4. The filter element of claim 2, wherein the flutes are closed proximate both opposed axial ends of the filter media, wherein the filter element is a radial flow filter element, further including a central chamber, at least one of the end caps defining a fluid port communicating with the central chamber.

5. The filter element of claim 4, further comprising a perforated support core situated in the central chamber around which the face sheet and the convoluted sheet are coiled, the support core defining a flow channel in communication with the fluid port.

6. The filter element of claim 2, wherein the contaminant adsorbent material comprises self-assembled monolayers on mesoporous supports (SAMMS).

7. The filter element of claim 6, wherein the SAMMS includes a form of SAMMS particulate powder material trapped in the pockets, the particulate powder material having an average particle size of between 10 microns and 100 microns, wherein at least one of the face sheet and the convoluted sheet has filtration efficiency of greater than 99% for the average particle size of the SAMMS particulate powder, and wherein at least 90% of the SAMMS particulate powder material by weight falls into a size category distribution of between 20 and 80 microns.

8. The filter element of claim 2, wherein each of the face sheet and the convoluted sheet comprises the following characteristics:
   (a) a Frazier Permeability of between about 6 and about 20 CFM @ 5" WG;
   (b) an average fiber diameter of between about 2 and about 50 microns;
   (c) a base weight of between about 30 and about 200 lb/3000 ft2;

(d) an average pore size generally between about 2 and about 80 microns; and (e) a Mullen burst strength of between about 5 and about 100 psi.

9. The filter element of claim 1, wherein the end caps close opposed axial ends of the filter media, the filter media defining a central cavity, one of the end caps having a fluid port communicating with the central cavity, wherein the filter media defines a radial fluid flow path between the central cavity and an outer periphery of the filter media, and the radial fluid flow path traveling through the plurality of pockets filled with the contaminant adsorbent material.

10. The filter element of claim 1, wherein the contaminant adsorbent material comprises a form of SAMMS particulate powder material, the particulate powder material having an average particle size of between 10 microns and 100 microns, wherein the filter media which forms the plurality of pockets has filtration efficiency of greater than 90% for the average particle size of the SAMMS particulate powder, wherein at least 90% of the SAMMS particulate powder material by weight falls into a size category distribution of between 20 and 100 microns.

11. The filter element of claim 10, wherein the ratio of a length to perimeter of the filter element is between 0.3 and 6.

12. The filter element of claim 1, wherein the contaminant adsorbent material is adapted to remove heavy metals from a fluid, including the removal by adsorption of at least one of mercury, silver, lead, uranium, plutonium, neptunium, americium, arsenic, cadmium, or a combination thereof.

13. The filter element of claim 1, wherein the contaminant adsorbent material includes a porous particle made from self-assembled monolayers on mesoporous supports (SAMMS), wherein the porous particle has a pore size ranging from about 2 to 7 nanometers.

14. The filter element of claim 1, wherein the contaminant adsorbent material includes porous particles comprising silica.

15. The filter element of claim 1, wherein the contaminant adsorbent material includes carbon particles ranging from 8 to 30 mesh size.

16. The filter element of claim 1, wherein contaminants being removed by the contaminant adsorbent material are different than those removed by the filter media.

17. A fluted filter element, comprising:
a fluted filter media having opposed axial ends and a central cavity along an axis, the fluted filter media comprising a face sheet and a convoluted sheet attached to the face sheet and wound in a coiled configuration about the axis to define a plurality of flutes, each of the flutes being closed proximate to both opposed axial ends, wherein the fluted filter media defines a radial fluid flow path between an outer periphery of the fluted filter media and the central cavity, wherein the radial flow path travels through a plurality of layers of the face sheet and a plurality of layers of the convoluted sheet, wherein a contaminant adsorbent material is filled in the plurality of flutes.

18. The fluted filter element of claim 17, wherein the radial flow path travels through between 3 and 30 layers of the face sheet and the convoluted sheet combined.

19. The fluted filter element of claim 17, further comprising a pair of end caps sealingly bonded to the opposing axial ends of the filter media, at least one of the end caps including a fluid port in communication with the central cavity.

20. The fluted filter element of claim 17, wherein the contaminant adsorbent material includes a porous particle made from self-assembled monolayers on mesoporous supports (SAMMS), and wherein the porous particles have a pore size ranging from about 2 to 7 nanometers, and an average particle size of between 10 microns and 100 microns, and wherein at least one of the face sheet and the convoluted sheet has a filtration efficiency of greater than 90% for the average particle size of the porous particles, and wherein at least 90% of the SAMMS porous particles by weight falls into a size category distribution of between 20 and 100 microns.

* * * * *

UNITED STATES PATENT AND TRADEMARK OFFICE
CERTIFICATE OF CORRECTION

| | | |
|---|---|---|
| PATENT NO. | : 8,197,687 B2 | Page 1 of 1 |
| APPLICATION NO. | : 12/539734 | |
| DATED | : June 12, 2012 | |
| INVENTOR(S) | : John A. Krogue and Daniel M. Cloud | |

It is certified that error appears in the above-identified patent and that said Letters Patent is hereby corrected as shown below:

In column 12, line 30, "closed proximate at least one axial end of the filter media by" should read --closed proximate at at least one axial end of the filter media by--

Signed and Sealed this
Thirty-first Day of July, 2012

David J. Kappos
*Director of the United States Patent and Trademark Office*